US012191077B2

(12) United States Patent
Licht

(10) Patent No.: US 12,191,077 B2
(45) Date of Patent: Jan. 7, 2025

(54) METHOD FOR CLOSING A CONTACTOR, AND CONTACTOR HAVING TEMPERATURE COMPENSATION

(71) Applicant: Schaltbau Gmbh, Munich (DE)

(72) Inventor: Peter Licht, Aschheim (DE)

(73) Assignee: Schaltbau Gmbh, Munich (DE)

( * ) Notice: Subject to any disclaimer, the term of this patent is extended or adjusted under 35 U.S.C. 154(b) by 0 days.

(21) Appl. No.: 17/602,135

(22) PCT Filed: Apr. 8, 2020

(86) PCT No.: PCT/EP2020/060022

§ 371 (c)(1),
(2) Date: Oct. 7, 2021

(87) PCT Pub. No.: WO2020/208074

PCT Pub. Date: Oct. 15, 2020

(65) Prior Publication Data

US 2022/0157504 A1 May 19, 2022

(30) Foreign Application Priority Data

Apr. 8, 2019 (DE) ..................... 10 2019 109 176.4

(51) Int. Cl.
*H01H 47/02* (2006.01)
*H01F 7/18* (2006.01)

(52) U.S. Cl.
CPC ........... *H01F 7/1844* (2013.01); *H01H 47/02* (2013.01); *H01F 2007/1855* (2013.01); *H01H 2047/025* (2013.01)

(58) Field of Classification Search
CPC .............. H01H 2047/025; H01H 47/02; H01F 2007/1855; H01F 7/1844
See application file for complete search history.

(56) References Cited

U.S. PATENT DOCUMENTS 10,101,393 B2 10/2018 Bock et al.
2006/0098375 A1 5/2006 Lluch et al.
2016/0133412 A1* 5/2016 Bock .................... H01H 47/002 361/187

FOREIGN PATENT DOCUMENTS

DE 102008053816 A1 * 5/2009 ........... H01F 7/1844
DE 10 2010 031 333 A1 1/2012

(Continued)

OTHER PUBLICATIONS

German Office Action dated Jan. 5, 2020 in related German Patent Application No. 10 2019 109 176.4 (six pages).

(Continued)

*Primary Examiner* — Harry R Behm
(74) *Attorney, Agent, or Firm* — Kilpatrick Townsend & Stockton LLP

(57) ABSTRACT

Disclosed is a method for closing the contacts of an electrical switching device during a switch-on process, wherein
for a fixed first time period, the first time period and the first voltage being selected in such a way that the armature is not set into motion during the first time period,
or the first voltage is applied to the coil until a certain current value is reached, the first time period being the time period until said certain current value is reached, and the first voltage being selected in such a way that the armature is not set into motion during the first time period,
wherein a suitable second voltage is defined, the second voltage being greater than the first voltage and being applied to the coil during a second time period in order to move the armature from the open position into the closed position.

9 Claims, 2 Drawing Sheets

(56) References Cited

FOREIGN PATENT DOCUMENTS

Figure 1:
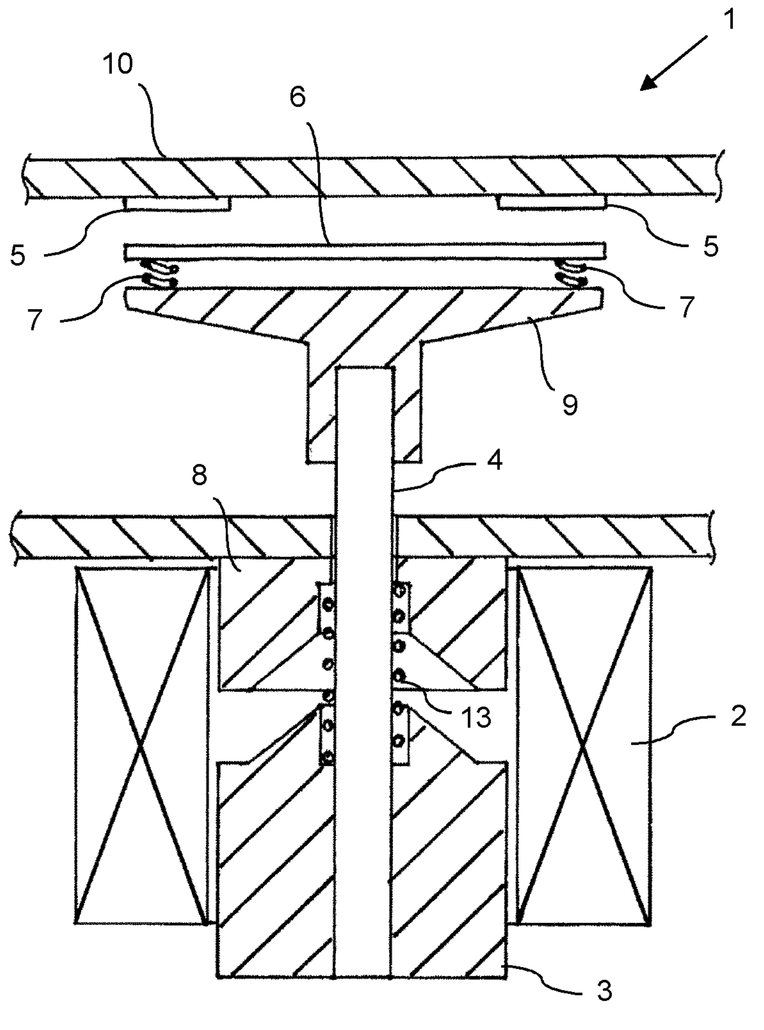

| | | | | |
|---|---|---|---|---|
| DE | 102012112201 | A1 * | 6/2014 | ........... H01F 7/1844 |
| EP | 1 811 539 | A1 | 7/2007 | |
| EP | 3 018 678 | A1 | 5/2016 | |
| EP | 3 432 335 | A1 | 1/2019 | |
| JP | S60-180032 | A | 9/1985 | |
| JP | H11-315745 | A | 11/1999 | |
| JP | 2004-186052 | A | 7/2004 | |
| JP | 4862064 | B2 | 1/2012 | |

OTHER PUBLICATIONS

International Search Report (ISR) mailed Jun. 22, 2020 in related International Application No. PCT/EP2020/060022 (five pages).
Notice of Reasons for Refusal Office Action dated Dec. 26, 2022 in related Japanese Patent Application No. 2021-558750 (six pages).
Korean Office Action dated Jul. 21, 2023 in related Korean Application No. 10-2021-7036287 (eight pages).
Communication pursuant to Article 94(3) EPC dated Dec. 18, 2023 in related European application No. 20 717 863.3 (21 pages).

* cited by examiner

METHOD FOR CLOSING A CONTACTOR, AND CONTACTOR HAVING TEMPERATURE COMPENSATION

This application is a U.S. National Phase Application of PCT/EP2020/060022, filed Apr. 8, 2020, which claims the priority of German Patent Application 10 2019 109 176.4, filed Apr. 8, 2019, the entireties of which are incorporated by reference herein.

The present invention relates to an electrical switching device and a method for closing the contacts of the electrical switching device during a switch-on process. The electrical switching device has an electromechanical drive with a coil and with an armature, which can be moved between an open position and a closed position, wherein the coil is energized in order to close the contacts of the electrical switching device. The armature of the electromechanical drive is connected with a movable contact of the electrical switching device.

Electrical switching devices, in particular high-power contactors, are subjected to sometimes high thermal fluctuations in many fields of application. This is true, for example, for high-power contactors which are employed in railway vehicles, motor vehicles, or in outdoor installations. The coil of the electromagnetic drive can moreover be subjected to very high thermal fluctuations in operation just due to self-heating.

In railway applications, the temperature range reaches from about −40° C. in Siberia to 110° C. in certain desert areas. The electric resistance of the coil changes here by the factor 1.8. If no compensation is accomplished, the pickup current—the current which flows in the coil when the contacts are being closed—and the switching behavior of the switching device change correspondingly. In a cold state, the pickup is faster due to the lower resistance, which may lead to an increased bouncing of the contacts of the electrical switching device during closing, and which quite basically results in an increased mechanical load of the components. At very high temperatures, the contacts are possibly not closed quickly enough, so that fluttering events and an increased wear due to arcing may result.

If there is no temperature compensation, the drive thus has to be designed to be more robust and therefore larger. This leads to comparatively heavy and expensive switching devices.

If, however, a temperature compensation is to be accomplished, a lower voltage must be applied to the coil at low temperatures, and a higher voltage at higher temperatures to be able to ensure a uniform switching behavior or a uniform switch-on time or pickup time, respectively, over the complete temperature range. To this end, the temperature prevailing in the coil or the coil resistance depending thereon must be detected. This can be done, for example, by means of a temperature sensor. An additional temperature sensor, however, results in a more cumbersome construction and renders the manufacture of the electrical switching device more expensive.

However, there are already also methods for measuring the coil inductance and the coil resistance without any direct determination of the coil temperature. Such a method is known, for example, from US 20180174786 A1. Such methods, however, require a comparatively high computing power and therefore demand the use of expensive microprocessors.

It is therefore the object of the present invention to indicate a method of the type mentioned in the beginning which permits a simple temperature compensation with low hardware demands and in particular without the requirement of a temperature sensor, and which does not disadvantageously extend the pickup process.

The object is achieved by the features of independent claim 1.

Accordingly, in a method according to the preamble of independent claim 1, the solution of the problem is according to the invention if first a constant first voltage $U_1$ is applied to the coil during a first time period $T_1$ and a measurement value is determined, wherein

- either the first time period $T_1$ is fixed, and the measurement value is a current value $I_{Mess}$ determined at the end of the first time period $T_1$ by measuring the current flowing in the coil, the first time period $T_1$ and the first voltage $U_1$ being selected in such a way that the armature is not set into motion during the first time period $T_1$,
- or the first voltage $U_1$ is applied to the coil until a certain current value $I_{Soll}$ of the current flowing in the coil is reached, the first time period $T_1$ being the time period until said certain current value $I_{Soll}$ is reached, the first time period $T_1$ being the measurement value, and the first voltage $U_1$ being selected in such a way that the armature is not set into motion during the first time period $T_1$, wherein a suitable second voltage $U_2$ is defined in accordance with the measurement value thus determined, the second voltage $U_2$ being greater than the first voltage $U_2$ and being applied to the coil during a second time period $T_2$ in order to move the armature from the open position into the closed position.

The idea of the present invention is based on the following known equation for the current through a coil upon the application of a voltage (this applies as long as the armature does not move):

$$I(t) = \frac{U}{R}\left(1 - e^{-\frac{t}{\tau}}\right) \text{ with } \tau = \frac{L}{R}$$

U the voltage applied to the coil,
R the (temperature-dependent) coil resistance,
L the inductance of the coil with the armature in the starting position.

If the quantities L, I, U and t are known, the coil resistance R can be calculated therefrom which in turn depends on the temperature. The actual calculation of the coil resistance, however, is not necessary according to the invention. Only a measurement value depending on the coil resistance and thus on the temperature is determined.

If the first time period $T_1$ is fixed, this measurement value is the current value $I_{Mess}$ which appears at the end of the first time period $T_1$. In accordance with this current measurement value $I_{Mess}$, the voltage $U_2$ which is finally applied to the coil to pick up the armature, that means to move the armature from the open position to the closed position and thereby close the contacts is thereupon defined. The optimal pickup voltage $U_2$ at a certain current measurement value $I_{Mess}$ can be previously determined, for example, experimentally by corresponding series of measurements and stored in a memory of a control unit of the switching device.

The first time period $T_1$ must be selected such that the armature does not already move during the first time period. Otherwise, the armature's reaction occurring in the magnetic field during the movement of the armature would falsify the current measurement at the end of the first time period, and the above-mentioned equation would no longer apply. The first time period must be long enough for the end values of the current measurement to be far away from each other at the upper and lower temperature limits—caused by the change of resistance of the coil due to the influence of temperature—such that a sufficiently large measuring range is achieved. The measuring accuracy and the resolution of the measuring device for the coil current must be taken into consideration here. The first voltage $U_1$ applied to the coil during the first time period $T_1$ should be selected preferably high so that the current flowing in the coil will become preferably high in the course of the first time period in such a way that during the first time period, at the lowermost operating temperature and taking into consideration tolerances, the armature does not yet move.

On the other hand, the first time period should be preferably short, so that the switch-on process is not unnecessarily delayed.

As an alternative to the above-described determination of the measurement value with a fixed first time period $T_1$, a fixed current limit $I_{Soll}$ to be achieved can also be defined. In this case, the measurement value depending on the temperature and thus on the coil resistance is the first time period $T_1$ which passes until the current limit $I_{Soll}$ is reached. Compared to the first alternative, this second alternative, however, is somewhat more complicated to realize since the coil current must be measured during the total first time period $T_1$. It will be appreciated that in this second alternative, too, firstly the first voltage $U_1$ must be kept constant until the predetermined current value $I_{Soll}$ is reached, and secondly, the first voltage $U_1$ or the current value $I_{Soll}$ to be reached must be defined such that the armature is not set into motion until the current limit $I_{Soll}$ is reached.

In both above-mentioned cases, the current will increase during the total first time period $T_1$. This means that the first time period $T_1$ does not last long enough for a stationary final current to appear in the coil. With R=U/I, the resistance can be quite easily determined in this case, however, the measuring time required for this would be clearly longer than the total common pickup process of the switching device and would therefore be inacceptable. A great advantage of the method according to the invention is thus that the pickup process is not remarkably extended.

During the first time period $T_1$, a constant first voltage $U_1$ is applied to the coil according to the invention. This means that there will be no closed-loop control of the current flowing in the coil. The constant voltage is applied to the coil over the total first time period $T_1$.

The present invention permits a simple temperature compensation without any complicated and expensive hardware. In particular, no temperature sensor is required to carry out the method according to the invention. Only a corresponding current measuring means is required to be able to measure the current flowing in the coil. In electrical switching devices with a closed-loop control of the holding current after the switch-on process, such a current measuring means is present anyway. To carry out the method, a small and inexpensive microcontroller can be used.

The present invention is in particular suited for electrical contactors.

Advantageous embodiments of the method according to the invention are the subject matter of subclaims.

According to a preferred embodiment of the present invention, the first time period $T_1$ is fixed, the measurement value being a current value $I_{Mess}$ determined at the end of the first time period $T_1$ by measuring a current flowing in the coil, the first time period $T_1$ and the first voltage $U_1$ being selected in such a way that the armature is not set into motion during the first time period $T_1$. As already described above, this embodiment is easier to realize than the alternative with a fixed current limit $I_{Soll}$.

According to a further preferred embodiment of the present invention, the second time period directly follows the first time period. This ensures a short switch-on time. In the determination or defining of the second voltage $U_2$ which is applied to the coil after the first time period $T_1$ has lapsed to move the armature from the open position to the closed position and thereby close the contacts, the current value for the coil current must be considered in the process, which is already reached at the end of the first time period and thereby forms the starting value for the pickup phase during the second time period $T_2$.

According to a further preferred embodiment of the present invention, the second voltage $U_2$ is constant during the second time period $T_2$. This substantially facilitates the method according to the invention. In the abstract, however, it is conceivable to impress a certain voltage characteristic during the second time period whose parameters are defined by means of the determined measurement value. A constant voltage in the sense of this embodiment is also understood as a mean voltage during the second time period adjusted by means of pulse width modulation.

According to a further embodiment of the present invention, the second voltage is defined in accordance with the measurement value such that the armature always reaches the same speed during the closing of the contacts independent of the temperature of the coil. The pickup voltage $U_2$ required for this at a certain temperature-dependent measurement value can be experimentally determined by corresponding series of measurements. To this end, the switching device can be, for example, correspondingly heated or cooled, respectively, wherein subsequently both the current measurement value $I_{Mess}$ at the end of the first time period $T_1$ and the switching behavior in different pickup voltages during the second time period $T_2$ are measured.

In an alternative embodiment, the second voltage is defined in accordance with the measurement value such that the armature is moved into the closed position always within the same time period during the closing of the contacts independent of the temperature of the coil. This means that the time period until the contacts are closed is to be always equal. In this embodiment, too, the required pickup voltage $U_2$ can be experimentally determined at a certain temperature-dependent measurement value.

According to a further preferred embodiment of the method according to the invention, the definition of the second voltage $U_2$ is accomplished by means of the measurement value by reading out a default value from a table stored in a memory. Thereby, no complicated calculations are required during the switch-on process. An inexpensive and simple microcontroller can be used for controlling. The mentioned table is furthermore preferably stored in the memory of the microcontroller used for controlling. In the table, for example, the concrete values for the pickup voltage (second voltage $U_2$), or else other default values suited for controlling can be stored. For example, instead of the concrete voltage values, pulse width modulation default values can be stored. For the voltage values $U_1$ and $U_2$ are preferably adjusted by means of pulse width modulation. Possible fluctuations of the supply voltage are here preferably compensated by corresponding changes of the pulse width modulation. For the method according to the invention, it is not necessary to determine concrete values for the resistance and/or the temperature of the coil in operation.

Only the correlation between the measurement value and the default value or voltage value $U_2$ derived from the resistance or temperature, respectively, is relevant.

As an alternative, an approximation function for calculating the default value can be derived from the concretely determined default values or from the values for the second voltage $U_2$ on the basis of the measurement value, so that instead of a complete table, only the parameters of a calculation specification must be transferred to the memory of the microcontroller used for controlling. While this requires a somewhat higher computing power, it needs less disk space. In this exemplified embodiment, too, possible fluctuations of the supply voltage are preferably compensated by corresponding changes of the pulse width modulation.

The values for the pickup voltage $U_2$ corresponding to a certain measurement value or the above-discussed default values are preferably determined for a larger temperature range, for example for a temperature range of maximally 0° C. to at least 50° C., further preferred for a temperature range of maximally −20° C. to at least 80° C., further preferred for a temperature range of maximally −40° C. to at least 110° C., and particularly preferred for a temperature range of maximally −60° C. to at least 130° C. The values are stored in a table, and either the table itself or the calculation specification derived therefrom is transferred to the memory of the microcontroller. For a satisfactory temperature compensation, it is sufficient for the values to be determined for discrete temperatures with a delta of, for example, 1° C., or also with greater differences of, for example, 5° C. Since the concrete temperatures are not relevant after all for the method, the input quantity into the table is, however, the measurement value. Therefore, for the table, measurement values with a constant delta are preferably used, which does not reflect in a constant delta of the temperature.

After the second time period has lapsed, the control unit can pass over into a holding mode. Since for holding the armature in the closed position, less power is required than for picking up the armature, the performance can be reduced. According to a further embodiment of the method according to the invention, the second time period $T_2$ is fixed, thus further facilitating the method. Preferably, the second time period $T_2$ may alternatively end when a suited sensory mechanism or evaluation recognizes that the armature is in the closed position. In this embodiment of the method according to the invention, too, the control unit can subsequently pass over into the holding mode.

The disclosure furthermore provides an electrical switching device whose control unit is designed and configured to carry out the method, discussed herein.

According to a preferred embodiment of the electrical switching device, the control unit comprises a microcontroller in which a table with possible measurement values and corresponding default values or, according to an alternative embodiment, a calculation specification for calculating a default value by means of the measurement value, is stored.

The invention will be illustrated more in detail below with reference to drawings.

Figure 2:
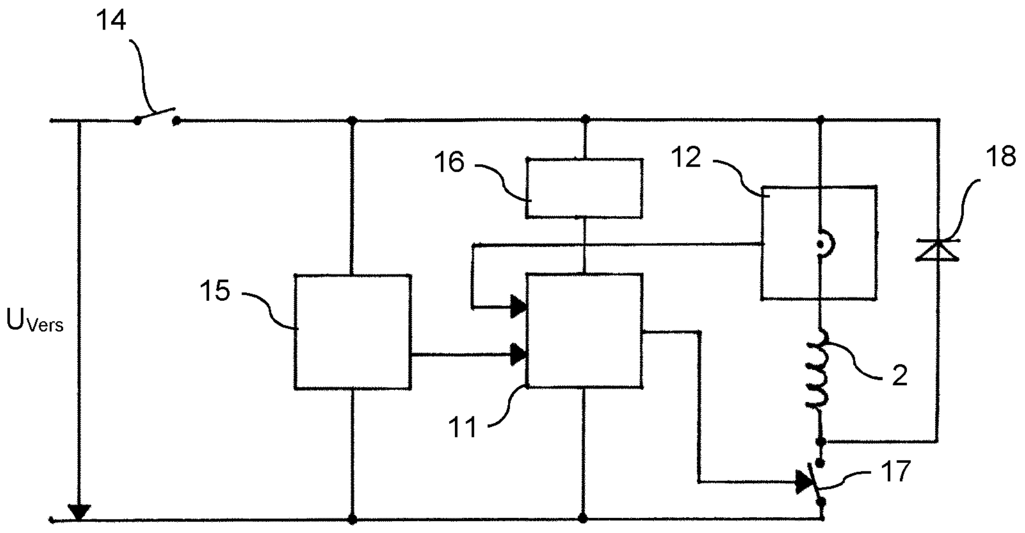
Figure 3:
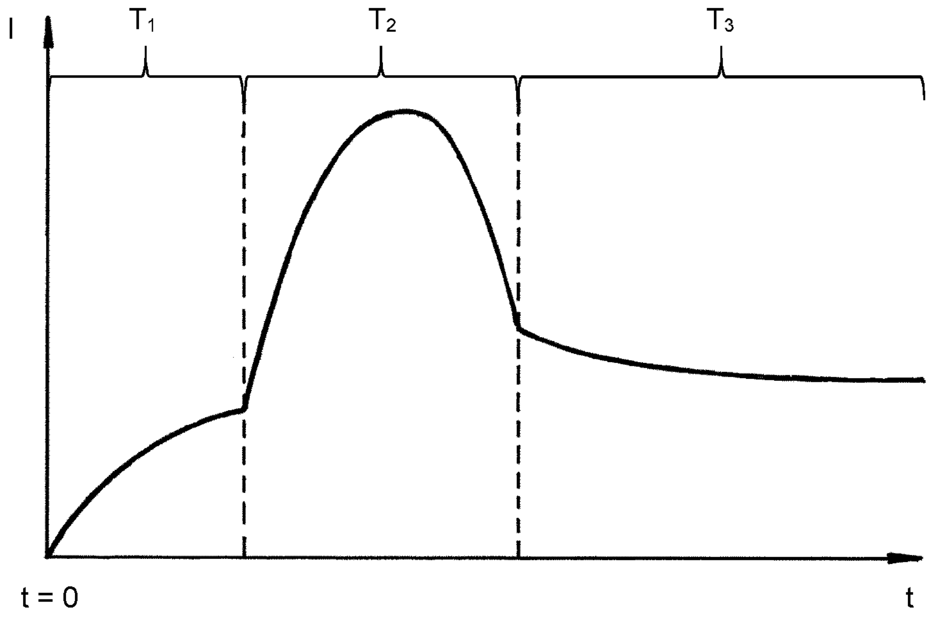

In the drawing:

FIG. 1 shows a schematic representation of a contactor according to the invention according to one embodiment, FIG. 2 shows a wiring diagram of the contactor according to the invention of FIG. 1, and FIG. 3 shows the current characteristic in the coil of the contactor according to the invention.

In the following illustrations, equal parts are designated by equal reference numerals. If a drawing contains reference numerals which are not explicitly discussed in the pertaining description of the figures, reference is made to previous or following descriptions of the figures.

FIG. 1 shows a schematic representation of a contactor 1 according to the invention according to one embodiment of the present invention. The contactor 1 comprises a housing 10 only represented in sections, and a double-gap contact point. The contact point consists of the two fixed contacts 5 and the movable contact bridge 6. The contact bridge 6 is mounted on a contact support 9 via contact pressure springs 7, the contact support 9 being connected to the movable armature 3 of the electromagnetic drive of the contactor 1 via the switch rod 4. The armature 3 and the yoke 8 of the electromagnetic drive are at least partially enclosed by the coil 2 of the electromagnetic drive. During the current feed of the coil 2 by applying sufficient voltage, the armature 3 is attracted against the force of the readjusting spring 13 acting between the yoke 8 and the armature 3, so that the contacts are closed.

FIG. 2 shows the wiring diagram of the contactor according to the invention of FIG. 1. A current measuring means 12 serves to measure the current flowing in the coil 2 during operation. Component 15 is a voltage measuring device for measuring the supply voltage $U_{Vers}$ which can be subject to certain fluctuations. The measured quantities of the current measuring means 12 and the voltage measuring means 15 are supplied to a microcontroller 11 which processes the two measured quantities and generates therefrom a control signal for the circuit breaker 17 via which the coil 2 is activated. A voltage supply 16 for the microcontroller 11, the two measuring means 12 and 15, and optionally for a driver for activating the circuit breaker 17 is connected to the supply voltage $U_{Vers}$. A freewheeling diode 18 is furthermore located at the coil 2.

The switching-on of the supply voltage is effected via the supply voltage switch 14.

FIG. 3 shows the characteristic of the current I flowing in the coil 2 over time t. The switch-on process is divided into two phases. In the first phase during the first time period $T_1$, a constant first voltage $U_1$ is applied to the coil 2. In the exemplified embodiment presented here, the first time period $T_1$ is fixed, wherein at the end of the first time period $T_1$, the resulting current value $I_{Mess}$ in the coil 2 is measured. The first voltage $U_1$ and the first time period $T_1$ are here selected such that the armature is not set into motion during the first time period $T_1$.

In accordance with the measured current value $I_{Mess}$ depending on the temperature of the coil, a suited second voltage $U_2$ is defined thereupon which is larger than the first voltage $U_1$ and which is applied to the coil 2 during a second time period $T_2$ directly following the first time period $T_1$ to move the armature 3 from the open position into the closed position and thereby close the contacts. The second time period $T_2$ thus represents the second phase of the switch-on process. The second voltage $U_2$ corresponding to a certain current measurement value $I_{Mess}$ is read out, for example, from a table stored in the microcontroller.

Upon completion of the switch-on process, the control unit of the contactor passes over into a holding mode. The holding mode is maintained during the third time period $T_3$.

LIST OF REFERENCE NUMERALS

1 electrical switching device
2 coil

3 armature
4 switch rod
5 fixed contact
6 contact bridge
7 contact pressure spring
8 yoke
9 contact support
10 housing
11 microcontroller
12 current measuring means
13 readjusting spring
14 supply voltage switch
15 voltage measuring means
16 power supply
17 circuit breaker
18 freewheeling diode
t time
$T_1$ first time period
$T_2$ second time period
$T_3$ third time period
$U_{Vers}$ supply voltage
$U_1$ first voltage
$U_2$ second voltage
I current
$I_{Mess}$ current measurement value
$I_{Soll}$ predetermined current value
R coil resistance

The invention claimed is:

1. A method for closing contacts of an electrical switching device during a switch-on process, wherein the electrical switching device comprises an electromechanical drive with a coil and an armature which can be moved between an open and a closed position, and a microcontroller electrically coupled to the electrical switching device, the method comprising:

energizing the coil in order to close the contacts of the electrical switching device;

applying first a first voltage $U_1$ to the coil during a first time period $T_1$, wherein the first voltage $U_1$ is constant;

determining a measurement value;

determining, based on the measurement value, a second voltage $U_2$ from a table stored in a memory of the microcontroller, the table defining a correlation between the measurement value and the second voltage $U_2$, wherein the second voltage $U_2$ is greater than the first voltage $U_1$, the second voltage $U_2$ being constant; and applying the second voltage $U_2$ to the coil during a second time period $T_2$ in order to move the armature from the open position into the closed position, wherein the second time period $T_2$ directly follows the first time period $T_1$, and wherein either the first time period $T_1$ is fixed, and the measurement value is a current measurement value $I_{Mess}$ determined at the end of the first time period $T_1$ by measuring the current flowing in the coil, the first time period $T_1$ and the first voltage $U_1$ being selected in such a way that the armature is not set into motion during the first time period $T_1$, or the first voltage $U_1$ is applied to the coil until a certain current value $I_{Soll}$ of the current flowing in the coil is reached, the first time period $T_1$ being the time period until said certain current value $I_{Soll}$ is reached, the first time period $T_1$ being the measurement value, and the first voltage $U_1$ being selected in such a way that the armature is not set into motion during the first time period $T_1$, wherein the first time period $T_1$ is selected in such a way that the current increases during the total first time period $T_1$ and no stationary final current appears in the coil during the first time period $T_1$.

2. The method according to claim 1, wherein the first time period $T_1$ is fixed, and the measurement value is a current measurement value $I_{Mess}$ determined at the end of the first time period $T_1$ by measuring the current flowing in the coil, wherein the first time period $T_1$ and the first voltage $U_1$ are selected in such a way that the armature is not set into motion during the first time period $T_1$.

3. The method according to claim 1, wherein the second voltage $U_2$ is determined in accordance with the measurement value such that the armature always reaches the same speed during the closing of the contacts independent of a temperature of the coil.

4. The method according to claim 1, wherein the second voltage $U_2$ is determined in accordance with the measurement value such that the armature is moved into the closed position always within the same time period during the closing of the contacts independent of a temperature of the coil.

5. The method according to claim 1, wherein a definition of the second voltage $U_2$ by means of the measurement value is effected by reading out a default value from a table stored in a memory, or by applying a calculation specification for calculating the default value by means of a measurement value.

6. The method according to claim 1, wherein the second time period $T_2$ is fixed.

7. The method according to claim 1, wherein the second time period $T_2$ ends when a suited sensory mechanism or evaluation recognizes that the armature is in the closed position.

8. An electrical switching device with contacts and an electromagnetic drive for closing the contacts, wherein the electromechanical drive comprises a coil and an armature movable between an open position and a closed position, wherein the electrical switching device furthermore comprises a current measuring circuit for measuring the current flowing in the coil, and wherein the electrical switching device comprises a control unit, wherein the control unit is designed and configured to carry out the method according to claim 1.

9. An electrical switching device according to claim 8, wherein the control unit comprises the microcontroller in which a table with possible measurement values and corresponding default values, or a calculation specification for calculating the default values by means of the measurement values, is stored.

* * * * *